United States Patent
Saito

(10) Patent No.: US 8,485,461 B2
(45) Date of Patent: Jul. 16, 2013

(54) SPINNING REEL SPOOL COUPLING STRUCTURE

(75) Inventor: Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 448 days.

(21) Appl. No.: 12/841,638

(22) Filed: Jul. 22, 2010

(65) Prior Publication Data

US 2011/0042500 A1   Feb. 24, 2011

(30) Foreign Application Priority Data

Aug. 20, 2009   (JP) .................................. 2009-190907

(51) Int. Cl.
*A01K 89/01* (2006.01)
(52) U.S. Cl.
USPC ......................................... 242/322; 242/318
(58) Field of Classification Search
USPC .................................................. 242/322, 318
See application file for complete search history.

(56) References Cited

U.S. PATENT DOCUMENTS

| | | | | |
|---|---|---|---|---|
| 5,078,334 A | * | 1/1992 | Zanon | 242/322 |
| 5,419,505 A | * | 5/1995 | Yoshikawa | 242/322 |
| 5,607,114 A | * | 3/1997 | Henriksson | 242/244 |
| 5,947,400 A | * | 9/1999 | Tsutsumi | 242/322 |
| 6,286,772 B1 | * | 9/2001 | Koelewyn | 242/322 |
| 6,598,819 B2 | | 7/2003 | Furomoto | 242/319 |
| 6,679,445 B2 | * | 1/2004 | Morise et al. | 242/322 |
| 6,857,589 B2 | * | 2/2005 | Kitajima | 242/318 |
| 6,978,957 B2 | * | 12/2005 | Sugawara | 242/322 |
| 2004/0104291 A1 | * | 6/2004 | Kitajima | 242/322 |
| 2004/0251363 A1 | | 12/2004 | Sugawara | |
| 2011/0180646 A1 | * | 7/2011 | Hiraoka | 242/241 |

FOREIGN PATENT DOCUMENTS

| | | |
|---|---|---|
| EP | 1 425 966 A1 | 6/2004 |
| JP | 06-068447 U | 9/1994 |
| JP | 3045338 U | 11/1997 |
| JP | 2603123 Y | 2/2000 |
| JP | 2006-87357 A | 4/2006 |

OTHER PUBLICATIONS

European Office Action of the corresponding European Application No. 10 171 706.4, dated Aug. 1, 2012.
Extended European Search Report of the corresponding European Application No. 10171706.4, dated Feb. 22, 2011.
Japanese Office Action of the corresponding Japanese Application No. 2009-190907, dated Feb. 26, 2013.

* cited by examiner

*Primary Examiner* — Emmanuel M Marcelo
(74) *Attorney, Agent, or Firm* — Global IP Counselors, LLP

(57) ABSTRACT

A spinning reel spool coupling structure has a pin insertion portion, an anti-rotation pin, a retainer, and an anti-rotation groove. The pin insertion portion has a through hole passing through the spool shaft. The anti-rotation pin includes a first anti-rotation portion, a fitting portion, and a second anti-rotation portion. The fitting portion adjoins the first anti-rotation portion, and fits into the pin insertion portion. The second anti-rotation portion extends from the fitting portion and has a diameter greater than that of the pin insertion portion. The retainer member prevents the anti-rotation pin from being detached from the spool shaft, is disposed on an outer peripheral side of the first anti-rotation portion, and has an axial length such that the retainer member contacts the spool shaft. The anti-rotation groove is formed to extend in a direction substantially perpendicular to a length of the spool shaft, and engages the second anti-rotation portion.

16 Claims, 7 Drawing Sheets

SPINNING REEL SPOOL COUPLING STRUCTURE

CROSS-REFERENCE TO RELATED APPLICATIONS

This application claims priority to Japanese Patent Application No. 2009-190907 filed on Aug. 20, 2009, the entirety of which is hereby incorporated by reference.

BACKGROUND

1. Field of the Invention

The present invention relates to a coupling mechanism, more specifically, to a spinning-reel spool coupling structure for coupling a spinning-reel spool to a spool shaft in a non-rotatable state while the spool shaft passes through the spinning-reel spool.

2. Background Information

In well-known spinning-reel spool coupling structures, a spool is coupled to a spool shaft in a unitarily rotatable state (i.e., a non-rotatable state or the spool does not rotate relative to the spool shaft) while being attached to and prevented from rotating at the distal end of the spool shaft. In some of the lever-brake spinning reels and the rear-drag spinning reels, for instance, the spool is coupled to the distal end of the spool shaft while being prevented from rotating with respect to the spool shaft. Japan Examined Utility Model Application Publication No. JP-Y-2603123 (especially, FIG. 10 thereof) describes a spinning reel with this type of structure.

In the well-known spool coupling structures, the spool is prevented from rotating about the spool shaft by detachably inserting an anti-rotation pin into a through hole radially passing through the spool shaft. More specifically, the spool is prevented from rotating about the spool shaft with a structure such that the outer peripheral surface of the anti-rotation pin is fitted with an anti-rotation groove formed on a boss portion of the spool along the diameter of the boss portion. Note the boss portion herein allows the spool shaft to pass through. The anti-rotation pin includes a flanged portion with a large diameter on a longitudinal intermediate part of its outer periphery in order to prevent detachment from the anti-rotation groove. The anti-rotation pin is further provided with an O-ring attached thereto for preventing detachment from the anti-rotation groove. Specifically, the attachment position of the O-ring is opposite to the position of the flanged portion through the spool shaft. In this position, the O-ring is allowed approximately to make contact with the spool shaft. More specifically, the O-ring is attached to an annular groove formed on the outer peripheral surface of the anti-rotation pin for preventing its axial movement. The annular groove can be positioned closer to the outer peripheral surface of the spool shaft.

Large tension generally acts on a fishing line when a fish is caught. Accordingly, a large force acts on the spool in its rotational direction. When the spool shaft is not smoothly rotated in addition to the condition, a large shear force acts on a boundary of the anti-rotation pin adjoining the spool shaft in the aforementioned spool coupling structure. In the lever-brake spinning reels configured to brake the rotor, for instance, a large shear force acts on the anti-rotation pin when a large tension acts on the fishing line and the rotor is herein braked. In the rear-drag spinning reels, on the other hand, large shear force acts on the anti-rotation pin when large tension acts on the fishing line under the condition that smooth rotation of the spool shaft is prevented by increasing drag force.

Incidentally, reduction in the diameter of the spool shaft has been demanded to reduce the entire size of the spinning reels. When the diameter of the spool shaft is reduced, sufficient strength cannot be ensured for the spool shaft unless the diameter of the anti-rotation pin is also reduced. This is because a ratio of the inner diameter of the through hole with respect to the outer diameter of the spool shaft is increased and thickness of the spool shaft is reduced in a surrounding area of the through hole. Therefore, reduction in diameter of the anti-rotation pin is required in response to that of the spool shaft. When a shear force acts on the outer peripheral surface of the spool shaft, however, stress concentrates on the annular groove and its periphery in the anti-rotation pin with a reduced diameter. It is therefore difficult to ensure sufficient strength for the anti-rotation pin.

In view of the above, it will be apparent to those skilled in the art from this disclosure that there exists a need for an improved spinning-reel spool coupling structure for ensuring strength of an anti-rotation pin even when the diameter of the anti-rotation pin is reduced in response to reduction in diameter of the spool shaft. This invention addresses this need in the art as well as other needs, which will become apparent to those skilled in the art from this disclosure.

SUMMARY

A spinning reel spool coupling structure according to a first aspect is a structure that couples a spinning reel spool to a spool shaft passing through the spinning reel spool under a condition in which the spinning reel spool is prevented from rotating relative to the spool shaft. The spool coupling structure includes a pin insertion portion, an anti-rotation pin, a retainer member, and an anti-rotation groove. The pin insertion portion includes a through hole passing through the spool shaft along the diameter of the spool shaft. The anti-rotation pin includes a first anti-rotation portion, a fitting portion, and a second anti-rotation portion. The first anti-rotation portion is provided on a first end of the anti-rotation pin. The fitting portion is disposed to adjoin to the first anti-rotation portion. The fitting portion has a length enabling the fitting portion to be fitted into the pin insertion portion. The second anti-rotation portion extends from the fitting portion towards a second end of the anti-rotation pin. The second anti-rotation portion has a diameter greater than that of the pin insertion portion. The retainer member prevents the anti-rotation pin from being detached from the spool shaft. The retainer member is disposed on an outer peripheral side of the first anti-rotation portion. The retainer member has an axial length enabling the retainer member to make contact with the spool shaft. The anti-rotation groove is formed along the diameter of the spool shaft in a part of the spool where the spool shaft passes through. The anti-rotation groove has a groove width enabling the second anti-rotation portion to be engaged therewith.

In the spinning reel spool coupling structure, the anti-rotation pin is inserted into the pin insertion portion of the spool shaft from the first end side where the first anti-rotation portion is positioned. A stepped portion, formed between the second anti-rotation portion with a large diameter and the fitting portion, is accordingly abutted to the outer peripheral surface of the spool shaft. The anti-rotation pin is thereby set to be in an appropriate position. The first anti-rotation portion, disposed on the first end side, protrudes from the pin insertion portion under this condition. The retainer member is attached to the protruding first anti-rotation portion to retain the anti-rotation pin. When the spool is attached to the spool shaft while the anti-rotation pin is attached to the spool shaft, the anti-rotation pin is engaged with the anti-rotation groove of the spinning reel spool. Accordingly, the spinning reel spool is coupled to the spool shaft while being prevented from rotating with respect to the spool shaft.

According to the spinning reel spool coupling structure of the first aspect, the anti-rotation pin is retained by attaching the retainer member to the first anti-rotation portion of the anti-rotation pin. Therefore, an annular groove for retaining the anti-rotation pin is not required to be formed on a part of the anti-rotation pin positioned in the vicinity of the outer peripheral surface of the spool shaft where shear force is produced. Consequently, strength of the anti-rotation pin can be ensured even when the diameter of the anti-rotation pin is reduced.

A spinning reel spool coupling structure according to a second aspect relates to the spinning reel spool coupling structure according to the first aspect. In the spinning reel spool coupling structure, the first anti-rotation portion has a diameter identical to that of the fitting portion. According to the spinning reel spool coupling structure of the second aspect, the anti-rotation pin can reliably have strength greater than that of an anti-rotation pin having a configuration in which the first anti-rotation portion has a diameter less than that of the fitting portion, because the anti-rotation pin herein has a configuration such that the fitting portion has an outer diameter identical to that of the first anti-rotation portion.

A spinning reel spool coupling structure according to a third aspect relates to the spinning reel spool coupling structure according to one of the first and second aspects. In this spinning reel spool coupling structure, the retainer member has an outer diameter enabling the retainer member to be engaged with the anti-rotation groove. According to the spinning reel spool coupling structure of the third aspect, the spool is prevented from easily wobbling because the retainer member has an outer diameter allowing it to be engaged with the anti-rotation groove.

A spinning reel spool coupling structure according to a fourth aspect relates to the spinning reel spool coupling structure according to one of the first to third aspects. In the spinning reel spool coupling structure, the retainer member includes a coil spring attachable to the outer peripheral side of the first anti-rotation portion. According to the spinning reel spool coupling structure of the fourth aspect, the anti-rotation pin can be retained by the structure in which one end of the coil spring is retained whereas the other end of the coil spring makes contact with the spool shaft in a free-length state or a compressed state.

A spinning reel spool coupling structure according to a fifth aspect relates to the spinning reel spool coupling structure according to the fourth aspect. In this spinning reel spool coupling structure, the anti-rotation pin further includes an annular groove formed on a part of the first anti-rotation portion on the first end side. Further, an end portion of the coil spring on the first end side is formed to have a small diameter enabling the end portion to be engaged with the annular groove. According to the spinning reel spool coupling structure of the fifth aspect, the annular groove is formed on the first end side on which shear force does not act. Therefore, the strength of the anti-rotation pin with a small diameter can be ensured even when the annular groove is formed on the anti-rotation pin. Simultaneously, the retainer member can be retained by the annular groove.

A spinning reel spool coupling structure according to a sixth aspect relates to the spinning reel spool coupling structure according to one of the first to fifth aspects. The spinning reel spool coupling structure further includes a sleeve fitted onto an outer peripheral surface of the spool shaft. The sleeve herein includes a retainer hole communicating with the pin insertion portion. According to the spinning reel spool coupling structure of the sixth aspect, even when the diameter of the spool shaft is reduced, it is possible to couple a spool, designed to be coupled to a spool shaft with a large diameter, to the spool shaft with a reduced diameter. Therefore, it is possible to maintain compatibility with the spool designed to be coupled to a spool shaft with a large diameter.

A spinning reel spool coupling structure according to a seventh aspect relates to the spinning reel spool coupling structure according to one of the first to sixth aspects. In this spinning reel spool coupling structure, the spinning reel spool includes a bobbin trunk allowing a fishing line to be wound thereon, and a tubular boss portion provided on an inner peripheral side of the bobbin trunk. The anti-rotation groove is formed on an end surface of the boss portion along the diameter of the boss portion. According to the spinning reel spool coupling structure of the seventh aspect, the spool and the spool shaft can be coupled while being allowed to rotate unitarily or prevented from rotating.

A spinning reel spool coupling structure according to an eighth aspect relates to the spinning reel spool coupling structure according to one of the first to sixth aspects. In the spinning reel spool coupling structure, the spinning reel spool includes a spool body and a tubular member. The spool body has a bobbin trunk allowing a fishing line to be wound thereon, and a tubular boss portion provided on an inner peripheral side of the bobbin trunk. The tubular member is attached to the spool shaft under a condition in which the tubular member supports the boss portion of the spool body in a rotatable state. The anti-rotation groove is formed on an end surface of the tubular member along the diameter of the tubular member. According to the spinning reel spool coupling structure of the eighth aspect, relative rotation is possible for the spool body and the tubular member. Therefore, a front drag mechanism can be disposed between the spool body and the tubular member.

According to the structure described herein, the anti-rotation pin is retained by attaching the retainer member to the first anti-rotation portion of the anti-rotation pin. Therefore, an annular retainer groove for retaining the anti-rotation pin is not required to be formed on a part of the anti-rotation pin positioned in the vicinity of the outer peripheral surface of the spool shaft where shear force is produced. Consequently, strength of the anti-rotation pin can be ensured even when the diameter of the anti-rotation pin is reduced.

These and other objects, features, aspects, and advantages of the present invention will become apparent to those skilled in the art from the following detailed description, which, taken in conjunction with the annexed drawings, discloses exemplary embodiments.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

FIRST EXEMPLARY EMBODIMENT

Entire Structure

Figure 1:
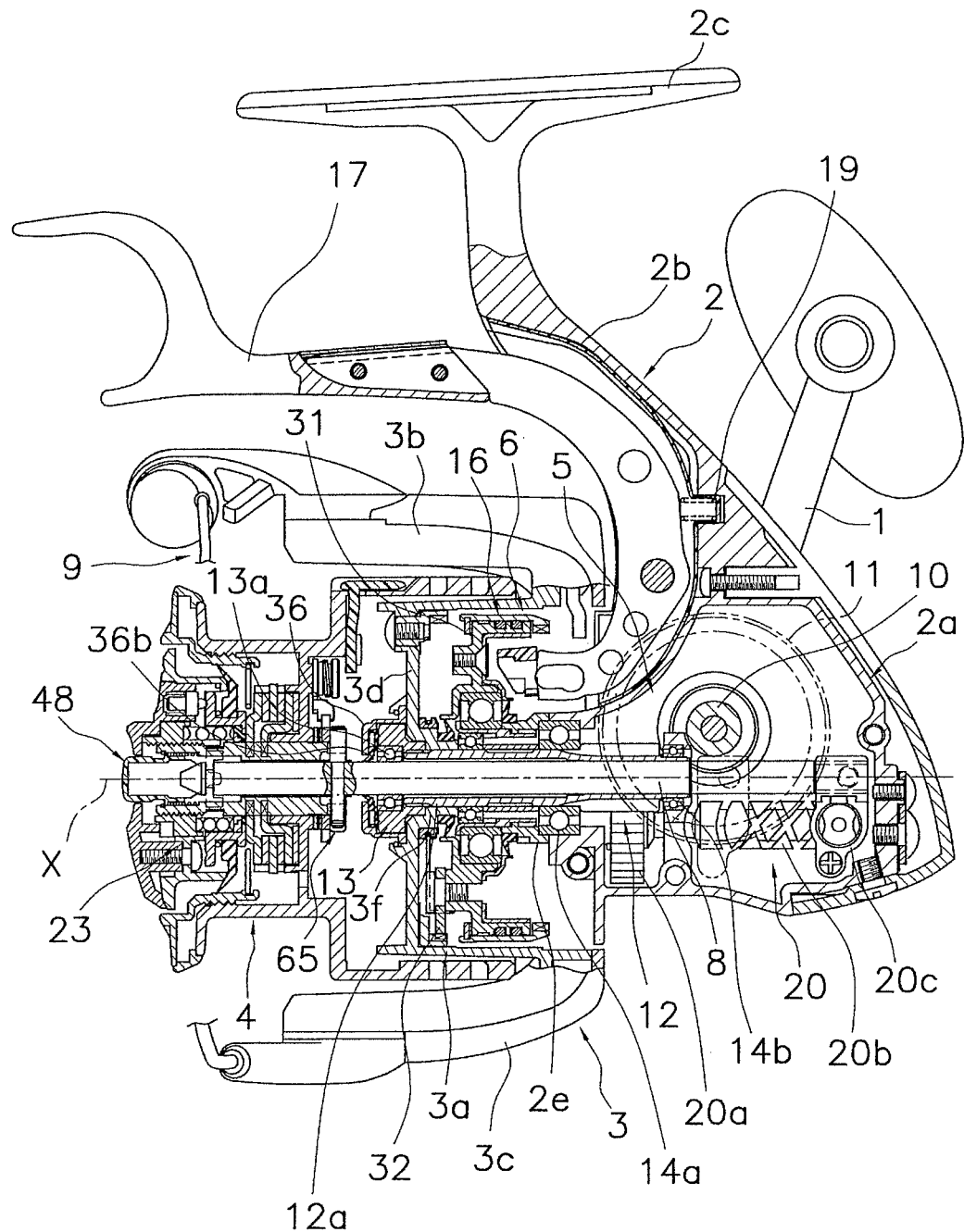
FIG. 1 is a cross-sectional side view of a spinning reel according to a first exemplary embodiment.

As illustrated in FIG. 1, a spinning reel according to a first exemplary embodiment is a lever-brake reel configured to wind a fishing line about a first axis X arranged along a longitudinal direction of a fishing rod. The spinning reel includes a reel unit 2, a rotor 3, and a spool 4. The reel unit 2 is provided with a handle 1. The rotor 3 is supported at the front of the reel unit 2 while being allowed to rotate about the first axis X. The spool 4 is disposed at the front of the rotor 3 in order to wind the fishing line.

The reel unit 2 is made of, for instance, magnesium alloy. As illustrated in FIG. 1, the reel unit 2 includes a fishing rod attachment portion 2c, a reel body 2a, and a leg portion 2b. The fishing rod attachment portion 2c is a longitudinally elongated portion to be attached to the fishing rod. The reel body 2a is disposed at a predetermined distance from the fishing rod attachment portion 2c. The leg portion 2b couples the fishing rod attachment portion 2c and the reel body 2a. The reel body 2a is integrally formed with the leg portion 2b, or formed as a one piece unitary member with the leg portion 2b. The reel body 2a includes a mechanism attachment space in its interior. The reel body 2a further includes an opening on its lateral side. The opening of the reel body 2a is covered with a lid member (not illustrated in the figure). Further, an attachment member 2e is attached to the front part of the reel body 2a. The attachment member 2e is a metal tubular member having an attachment flange. In the first exemplary embodiment, the leg portion 2b is integrally formed with the reel body 2a or formed as a one piece unitary member. However, the leg portion 2b may be integrally formed with the lid member.

The reel body 2a contains a rotor drive mechanism 5, a lever brake mechanism 6, and an oscillation mechanism 20 in its interior. The rotor drive mechanism 5 is configured to rotate the rotor 3 in conjunction with rotation of the handle 1. The lever brake mechanism 6 is configured to brake rotation of the rotor 3 in a fishing line release direction (i.e., reverse rotation of the rotor 3). The oscillation mechanism 20 is configured to reciprocate the spool 4 back and forth through a spool shaft 8 in conjunction with rotation of the handle 1.

The rotor 3 is made of, for instance, magnesium alloy. The rotor 3 is supported by the reel unit 2 in a rotatable state. The rotor 3 includes a cylindrical portion 3a, a first arm portion 3b, and a second arm portion 3c. The first arm portion 3b and the second arm portion 3c are disposed lateral to the cylindrical portion 3a while being opposed to each other. The cylindrical portion 3a includes a boss portion 3f on the center part of a front wall 3d. The boss portion 3f allows the spool shaft 8 and a pinion gear 12 described below to pass through. Further, a bail arm 9 is attached to the tips of the first and second arm portions 3b and 3c in a pivotable state. The bail arm 9 guides the fishing line onto the spool 4.

Spool Structure

The spool 4 is made of, for instance, aluminum alloy. The spool 4 is interposed between the first and second arm portions 3b and 3c of the rotor 3. The spool 4 can be detachably attached to the spool shaft 8 passing through the spool 4 in a single-touch operation of a single-touch attachment/detachment mechanism 48. Further, the spool 4 is coupled to the distal end of the spool shaft 8 while being prevented from rotating relative to the spool shaft 8 by a spool coupling structure 65.

Figure 2:
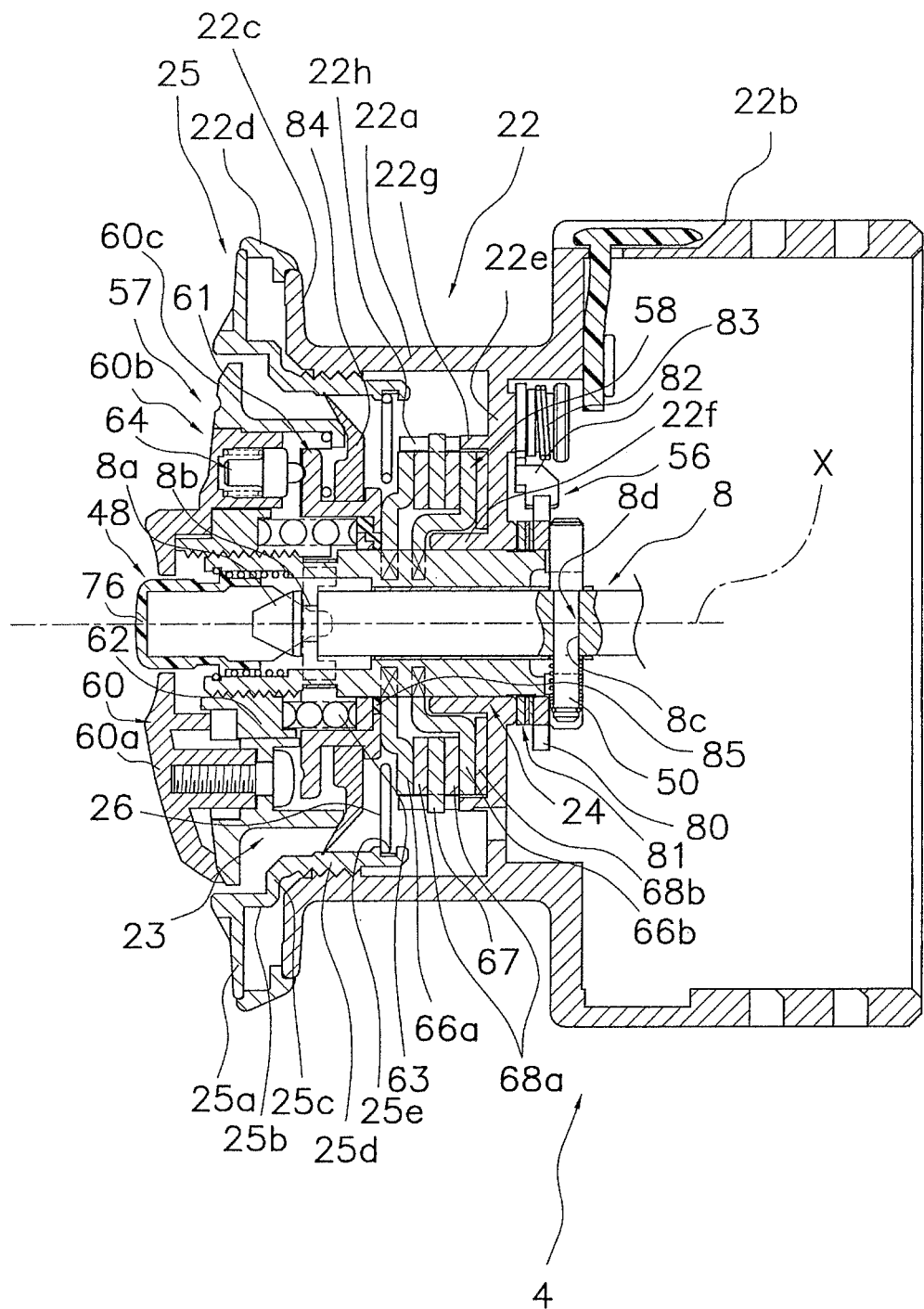
FIG. 2 is an enlarged cross-sectional view of a spool of the spinning reel and the periphery of the spool.

For example, the spool shaft 8 has an outer diameter less than that of a spool shaft used with the well-known spinning reels having a diameter identical to that of the spinning reel of the first exemplary embodiment. In the first exemplary embodiment, the outer diameter of the spool shaft 8 is set to be 4.0 mm, whereas the outer diameter of the spool shaft used for the well-known spinning reels is set to be, for instance, 4.5 mm (The numbers used herein are examples and not intended to limit the present invention as as defined by the appended claims and their equivalents.) As illustrated in FIG. 2, the spool shaft 8 includes a tapered surface 8a and a retainer groove 8b. The tapered surface 8a is formed on the distal end of the spool shaft 8. The retainer groove 8b is an annular groove formed rearward of the tapered surface 8a. The spool shaft 8 further includes a pin insertion portion 8d formed rearward of the retainer groove 8b. The pin insertion portion 8d includes a through hole 8c. The through hole 8c passes through the spool shaft 8 along its diameter. The through hole 8c of the pin insertion portion 8d allows an anti-rotation pin 50 to be detachably fitted therein.

Figure 3:
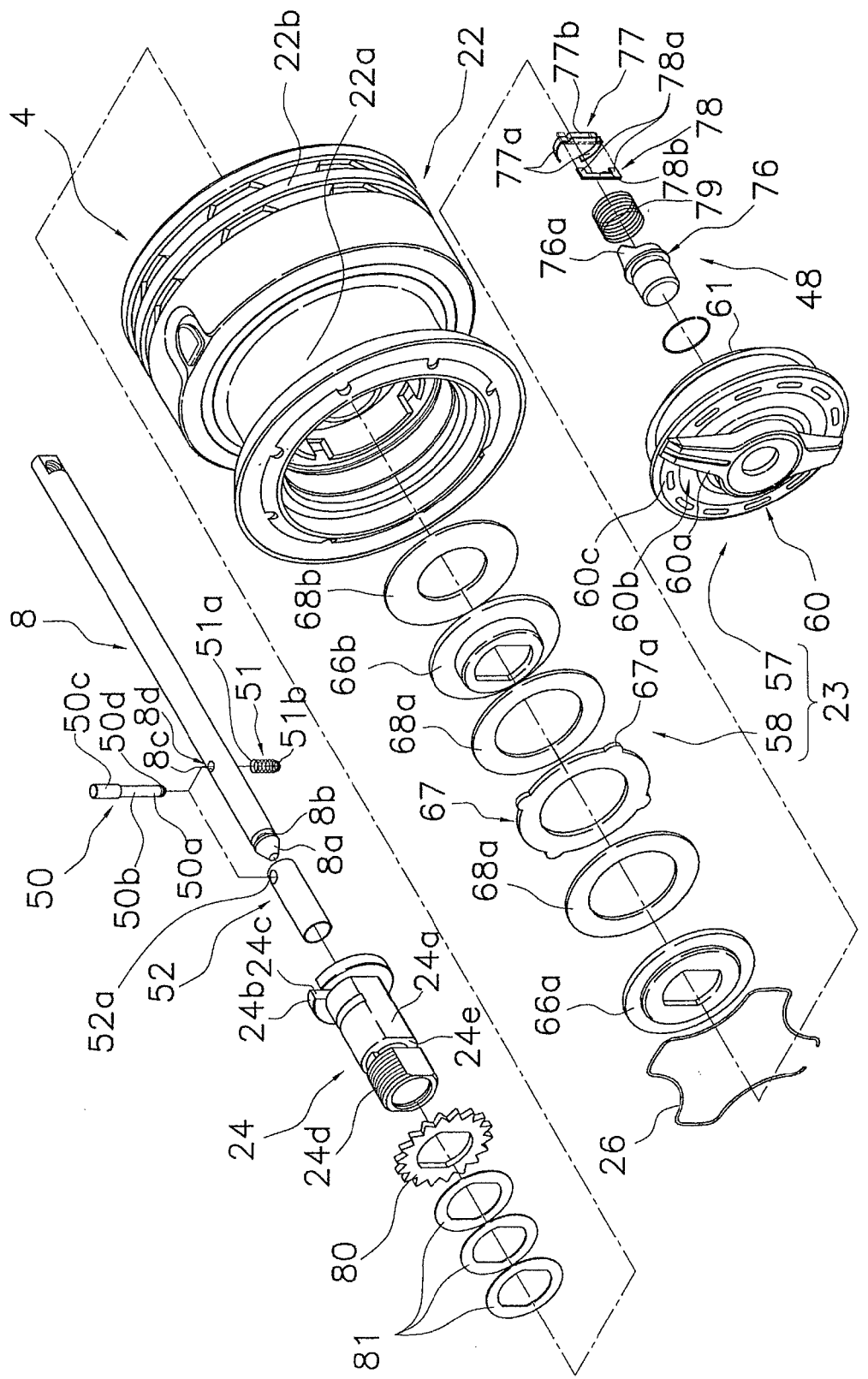
FIG. 3 is an exploded perspective view of a spool coupling structure of the spinning reel.

As illustrated in FIGS. 2 and 3, the spool 4 includes a spool body 22, a front drag mechanism 23, and a spool tubular portion 24. The front drag mechanism 23 is attached to the spool body 22. The spool tubular portion 24 (an example of a tubular member) allows the spool body 22 to be attached thereto in a rotatable state. The spool body 22 includes a bobbin trunk 22a, a skirt portion 22b, and a flange portion 22c. The bobbin trunk 22a is formed in a tubular shape. The skirt portion 22b is a tubular shaped portion formed on the rear end of the bobbin trunk 22a. The skirt portion 22b has a diameter greater than that of the bobbin trunk 22a. The flange portion 22c is formed on the front part of the bobbin trunk 22a. The flange portion 22c slants forward, i.e., extends to the front in a direction that is not perpendicular to the first axis X.

The bobbin trunk 22a includes an attachment disc portion 22e and an attachment tubular portion 22f. The attachment disc portion 22e extends from the bobbin trunk 22a in a radial inward direction. The attachment tubular portion 22f (an example of a boss portion) is formed on the inner peripheral side of the attachment disc portion 22e while being integrally formed with the attachment disc portion 22e. A pawl member 82 of a drag sound producing mechanism 56 described below is attached to the rear surface of the attachment disc portion 22e in a pivotable state. The drag sound producing mechanism is herein configured to produce sound when drag force is activated. On the other hand, a drag housing tubular portion 22g is forwardly protruded from the front surface of the attachment disc portion 22e. The drag housing tubular portion 22g houses the front drag mechanism 23. The drag housing tubular portion 22g includes single or plural (e.g., two or four)

slits 22h. The slit/slits 22h is/are configured to prevent relative rotation of a second drag washer 67 of a friction part 58 described below. When the drag housing tubular portion 22g includes plural slots 22h, they are circumferentially separated at predetermined intervals. The attachment tubular portion 22f is attached to the spool tubular portion 24 in a rotatable state.

A flow smoother member 22d is attached to the outer peripheral surface of the flange portion 22c. The flow smoother member 22d includes a tapered surface expanded towards its tip. In other words, the tapered surface of the flow smoother member 22d inclines outward and upward from a portion that contacts the flange portion 22c. The flow smoother member 22d is disposed for smoothly releasing the fishing line in casting without causing backlash of the fishing line. The flow smoother member 22d is fixed to the flange portion 22c by a flange fixation member 25. The flange fixation member 25 includes a press portion 25a, a first tubular portion 25b, a disc portion 25c, and a second tubular portion 25d. The press portion 25a is formed in a tapered shape and presses the flow smoother member 22d. The first tubular portion 25b extends rearward from the press portion 25a. The disc portion 25c protrudes from the rear part of the first tubular portion 25b in a radial inward direction. The second tubular portion 25d extends rearward from the disc portion 25c. The second tubular portion 25d is fixedly screwed into the inner periphery of the bobbin trunk 22a. Further, the second tubular portion 25d includes a recess 25e where a retainer spring 26 is attached. The retainer spring 26 herein prevents the front drag mechanism 23 from being detached out of the spool 4.

Figure 4:
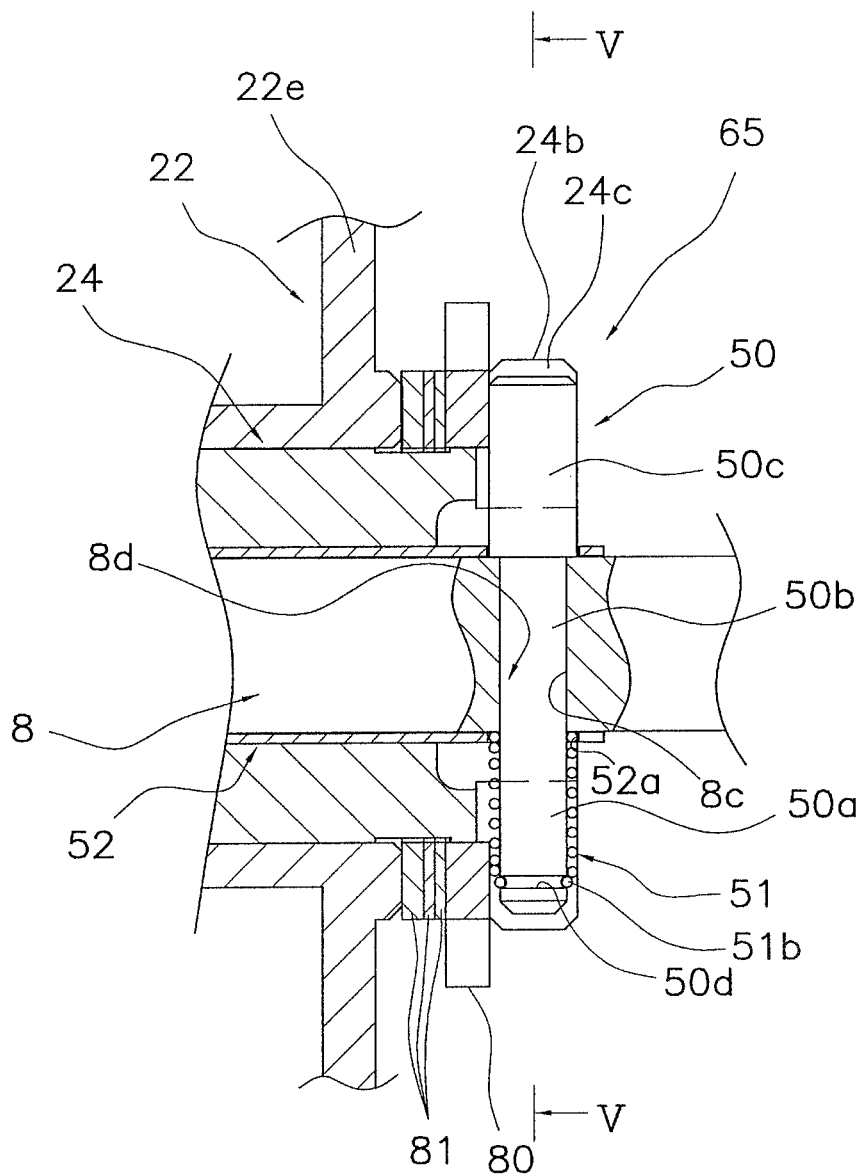
FIG. 4 is an enlarged cross-sectional view of the spool coupling structure of the spinning reel.
Figure 5:
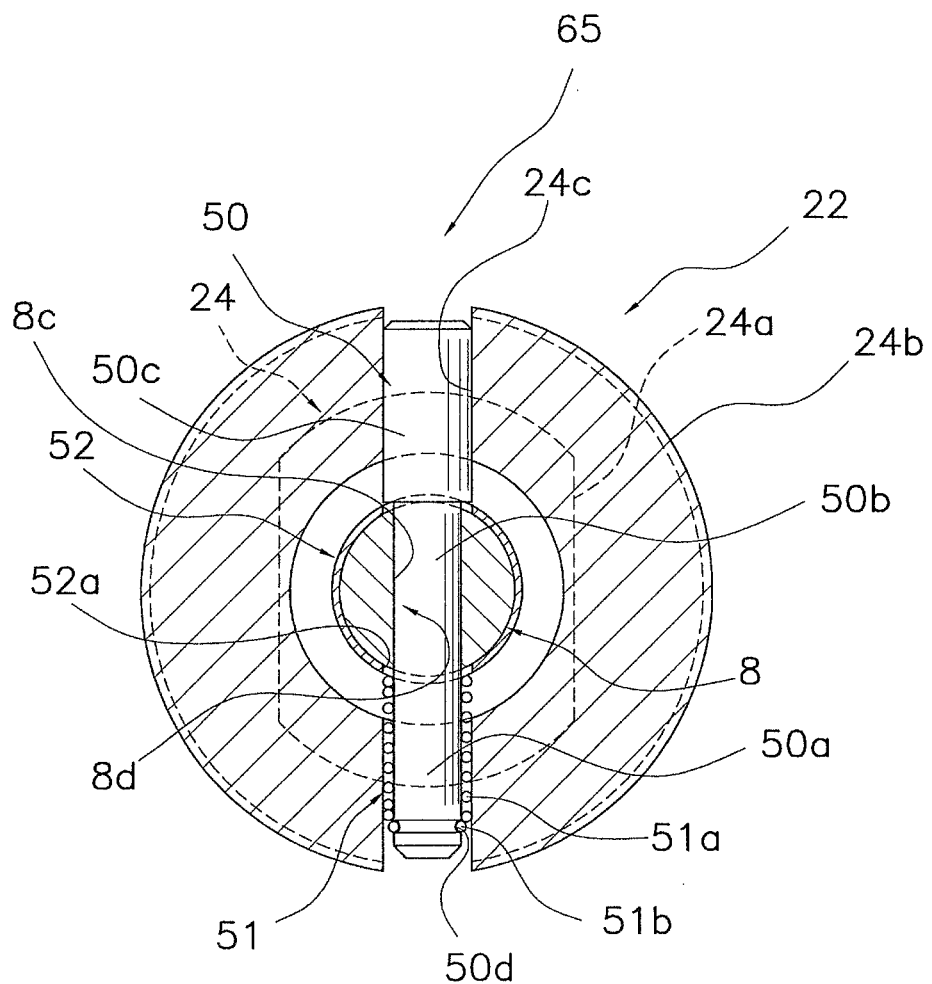
FIG. 5 is a cross-sectional view of the spool coupling structure in of spinning reel taken along line V-V in FIG. 4.

The spool tubular portion 24 has an inner diameter for allowing the well-known spool shafts with a diameter of, e.g., 4.5 mm to be attached thereto. As illustrated in FIGS. 3 and 5, the spool tubular portion 24 includes a pair of chamfered portions 24a on the outer peripheral surface of its intermediate part. The chamfered portions 24a are parallel-opposed. Further, as illustrated in FIGS. 3, 4, and 5, the spool tubular portion 24 includes a rear end portion 24b with a large diameter. The rear end portion 24b includes an engagement groove 24c (an example of an anti-rotation groove) where the anti-rotation pin 50 is engaged. The engagement groove 24c is formed along the diameter of the rear end portion 24b. The engagement groove 24c has a groove width matched with the outer diameter of the well-known anti-rotation pins for maintaining compatibility to the well-known anti-rotation pins. The spool tubular portion 24 is attached to the spool shaft 8 by the anti-rotation pin 50 while being prevented from rotating relatively.

The spool tubular portion 24 includes a male-threaded portion 24d, used for regulating drag, on the outer peripheral surface of its front end part. The spool tubular portion 24 further includes an attachment groove 24e formed rearward of the male threaded portion 24d. A plate spring 77 and a retainer plate 78 to be described of the single-touch attachment/detachment mechanism 48 are attached to the attachment groove 24e. The attachment groove 24e is formed in a D-shape by cutting out the spool tubular portion 24 to reach its inner peripheral surface. Further, a disc member 80 of the drag sound producing mechanism 56 (see FIG. 2) is attached onto the outer peripheral surface of the rear part of the spool tubular portion 24 while abutting the rear end portion 24b and prevented from rotating relatively. The disc member 80 is prevented from moving rearward and makes contact with the anti-rotation pin 50. This structure prevents the spool body 22 from moving rearward. As illustrated in FIG. 4, plural (e.g., three) spool washers 81, made of synthetic resin, are axially interposed between the disc member 80 and the attachment disc portion 22e for adjusting a position of the spool body 22 in a spool shaft direction. The spool washers 81 have a sealing function of blocking liquid intrusion from behind. As seen in FIG. 2, the single-touch attachment/detachment mechanism 48 is attached to the inner peripheral surface of the front end part of the spool tubular portion 24.

As illustrated in FIG. 3, the single-touch attachment/detachment mechanism 48 includes a push button 76, the plate spring 77, and the retainer plate 78. The push button 76 is attached to the interior of the spool tubular portion 24 while being allowed to move back and forth. The retainer plate 78 is disposed between the plate spring 77 and the push button 76. The push button 76 is a member formed in a roughly closed-end tubular shape. The push button 76 forwardly protrudes from an operation member 60 of the front drag mechanism 23 to be described. The push button 76 is prevented from being detached from the spool tubular portion 24 while being forwardly urged by a press spring 79 of a coil-spring type. The push button 76 includes a tapered cam protrusion 76a on its base end side. The cam protrusion 76 is provided for moving the plate spring 77 and the retainer plate 78. The plate spring 77 urges the retainer plate 78 in a radial inward direction of the spool tubular portion 24. The plate spring 77 is formed by roughly bending a spring plate in a D-shape. The plate spring 77 includes a pair of first engagement portions 77a and a second engagement portion 77b. The first engagement portions 77a are engaged with the attachment groove 24e of the spool tubular portion 24. The first engagement portions 77a are curved in a circular-arc shape. Proximal ends of the first engagement portions 77a are attached to the second engagement portion 77b. The second engagement portion 77b is convexly bent between the first engagement portions 77a to protrude away from the proximal ends of the first engagement portions 77a. The second engagement portion 77b is convexly bent to have first portions that attach to the proximal ends of the first engagement portions 77a and extend in a first direction. The second engagement portion 77b also has second portions that extend perpendicularly or substantially perpendicularly to the first portions. The second engagement portion further has a third portion that joins the second portions and extends parallel or substantially parallel to the first portions. The retainer plate 78 is disposed between the second engagement portion 77b and the cam protrusion 76a of the push button 76. The retainer plate 78 is configured to be engaged with or disengaged from the annular retainer groove 8b of the spool shaft 8. The retainer plate 78 is a plate member formed in a C-shape or like an upper case Greek letter pi (shown rotated 90 degrees in the drawing) having two parallel or substantially parallel straight block sections or first portions 78a whose proximal ends are joined by a block section or second portion 78b that extends perpendicularly or substantially perpendicularly to the parallel block sections. In other words, the retainer plate 78 is composed of a pair of first portions 78a and a second portion 78b. The first portions 78a are disposed on both ends of the retainer plate 78 and extend parallel or substantially parallel to each other. The first portions 78a engage with the attachment groove 24e and can contact the first portions of the second engagement portion 77b. The second member 78b is interposed between the first portions 78a and extends perpendicularly or substantially perpendicularly to the first portions 78a. The second member 78b engages with the retainer groove 8b. When the push button 76 is pressed, the retainer plate 78 is configured to move in a radial direction while being engaged with the cam protrusion 76a. Accordingly, the retainer plate 78 evenly moves the second engagement portion 77b of the plate spring 77 in the radial direction. Thus, the plate spring 77 can be stably displaced. Further, the spool 4 can be detached from the spool shaft 8 by disengaging the second member 78b of the retainer plate 78 from the retainer groove 8b through a press operation of the push button 76. On the other hand, when the spool 4 is attached to the spool shaft 8, the retainer plate 78 is moved in a radial-outward direction along the tapered surface 8a of the distal end of the spool shaft 8 while resisting against urging force of the plate spring 77. When reaching the retainer groove 8b, the retainer plate 78 is engaged with the retainer groove 8b by the urging force of the plate spring 77.

As illustrated in FIGS. 3, 4, and 5, the anti-rotation pin 50 includes a first anti-rotation portion 50a, a fitting portion 50b, and a second anti-rotation portion 50c. The first rotation portion 50a is formed in a first end of the anti-rotation pin 50. The first anti-rotation portion 50a includes an annular groove 50d in its tip. The annular groove 50d engages with a retainer member 51. The fitting portion 50b is disposed adjoining to the first anti-rotation portion 50a. The fitting portion 50b has a length and diameter enabling it to be fitted in the pin insertion portion 8d. In the first exemplary embodiment, the fitting portion 50b has a diameter identical to that of the first anti-rotation portion 50a. The second anti-rotation portion 50c extends from the fitting portion 50b towards a second end of the anti-rotation pin 50. The second anti-rotation portion 50c has a diameter greater than that of the pin insertion portion 8d and is also greater than the diameter of the fitting portion 50b. The second anti-rotation portion 50c has an outer diameter enabling it to be fitted with the engagement groove 24c. The second anti-rotation portion 50c is configured to abut the outer peripheral surface of the spool shaft 8 at its stepped portion adjoining to the fitting portion 50b when the anti-rotation pin 50 is attached to the pin insertion portion 8d. The second anti-rotation portion 50c has a diameter identical to that of the well-known anti-rotation pins, that is, a diameter enabling it to be engaged with an engagement groove of the well-known spools.

The retainer member 51 is attached to the outer peripheral side of the first anti-rotation portion 50a while being disposed on the opposite side of the second anti-rotation portion 50c through the spool shaft 8. The retainer member 51 prevents the anti-rotation pin 50 from being detached from the spool shaft 8. The retainer member 51 has an outer diameter enabling it to be engaged with the engagement groove 24c. The outer diameter of the retainer member 51 can contact the engagement groove 24c. Further, the retainer member 51 has an inner diameter enabling it to be fitted with the outer peripheral surface of the first anti-rotation portion 50a. Therefore, the outer diameter of the retainer member 51 is substantially identical to that of the second anti-rotation portion 50c. The inner diameter of the retainer member 51 can contact the outer diameter of the first anti-rotation portion 50a. For example, the retainer member 51 is a coil spring 51a in the first exemplary embodiment. The coil spring 51a includes an attachment portion 51b with a small diameter relative to the rest of the coil spring 51a on one end thereof. The attachment portion 51b is engaged with the annular groove 50d. The retainer member 51 is thereby prevented from being detached from the anti-rotation pin 50. The retainer member 51 has an axial length enabling it to make contact with the outer peripheral surface of the spool shaft 8. In the first exemplary embodiment, the retainer member 51 makes contact with the outer peripheral surface of the spool shaft 8 at the other end thereof while being slightly compressed.

A sleeve 52 is attached between the spool shaft 8 and the spool tubular portion 24 to maintain compatibility to the well-known spool shafts with a diameter of, e.g., 4.5 mm. The sleeve 52 includes an outer peripheral surface to be fitted with the inner peripheral surface of the spool tubular portion 24 through a slight clearance and an inner peripheral surface to be fitted with the outer peripheral surface of the spool shaft 8 through a slight clearance. The sleeve 52 includes a through hole 52a on its rear part that is closer to the rotor 3.

The through hole 52a is formed along the diameter of the sleeve 52. The through hole 52a allows the second anti-rotation portion 50c of the anti-rotation pin 50 and the retainer member 51 to pass through. The sleeve 52 can be retained by the structure such that the anti-rotation pin 50 and the retainer member 51 pass through the through hole 52a. The sleeve 52 allows the well-known spools, which are designed to be attached to the well-known spool shafts, to be herein attached to the spool shaft 8. Thus, the sleeve 52 can achieve compatibility to the well-known spools.

The spool coupling structure 65 is composed of the aforementioned components: the pin insertion portion 8d of the spool shaft 8; the anti-rotation pin 50; the retainer member 51; and the engagement groove 24c.

As illustrated in FIGS. 2 and 3, the front drag mechanism 23 includes a drag regulation part 57 and the friction part 58. The drag regulation part 57 is configured to regulate friction force of the friction part 58. The drag regulation part 57 includes the operation member 60 and a press member 61. The operation member 60 is screwed onto the spool tubular portion 24. The press member 61 is configured to press the friction part 58 when being pressed by the operation member 60.

As illustrated in FIGS. 2 and 3, the operation member 60, which is a member formed in a roughly flanged cylindrical shape, includes a knob handle 60b and a knob flange portion 60c. The knob handle 60b includes a knob protrusion 60a that protrudes along the diameter of the operation member 60. The knob handle 60b is fixed to the knob flange portion 60c. As illustrated in FIG. 2, a nut 62 is screwed onto the male threaded portion 24d of the spool tubular portion 24. The nut 62 is also attached to the center of the knob handle 60b while being axially movable and unitarily rotatable with the knob handle 60b. It should be noted that FIG. 2 illustrates the nut 62 in two conditions: the nut 62 illustrated above the first axis X; and the nut 62 illustrated below the first axis X. The nut 62 illustrated below the first axis X is screwed further to the right to increase its pressure compared to the nut 62 illustrated above the first axis X. A regulator spring 63 is attached between the nut 62 and the press member 61 in a compressed state. The regulator spring 63 is a coil spring for smoothly regulating drag force. The press member 61 is attached to the spool tubular portion 24 while being allowed to move axially but prevented from rotating. The press member 61 is coupled to the operation member 60 while being allowed to rotate and prevented from dropping off A first sealing member 85 is attached between the press member 61 and the inner periphery of the spool body 22 (e.g., the inner peripheral surface of the second tubular portion 25d of the flange fixation member 25) in order to seal a clearance between the spool body 22 and the drag regulation part 57. A second sealing member 85 is integrally formed with the rear part of the press member 61 by integral molding (e.g., insert molding or outsert molding) in order to seal a clearance between the press member 61 and the spool tubular portion 24. The first and second sealing members 84 and 85 and the spool washers 81 can block liquid intrusion into the friction part 58 regardless of attachment or detachment of the spool 4. A drag knob sound producing mechanism 64 is attached between the operation member 60 and the press member 61. The drag knob sound producing mechanism 64 is configured to produce sound when drag force is regulated by rotating the operation member 60.

Referring to FIGS. 2 and 3, the friction part 58 is attached between the press member 61 and the attachment disc portion 22e of the spool body 22. The friction part 58 includes a first drag washer 66a, a third drag washer 66b, and the second drag washer 67. The first drag washer 66a and the third drag washer 66b are attached to the chamfered portions 24a of the spool tubular portion 24 while being prevented from relatively rotating. The second drag washer 67 with single or plural tabs is attached to the bobbin trunk 22a while being unitarily rotatable with it. A drag disc 68a is attached between the first and second drag washers 66a and 67, and another drag disc 68a is attached between the second and third drag washers 67 and 66b. Further, a drag disc 68b is attached between the third drag washer 67b and the attachment disc portion 22e. As illustrated in FIG. 3, the second drag washer 67 includes single or plural (e.g., four) tabs 67a that protrude in its radial direction. The tab/tabs 67a is/are engaged with the aforementioned slit/slits 22h formed in the bobbin trunk 22a. It should be noted that the flange fixation member 25 is screwed into and adhered/bonded to the bobbin trunk 22a. Therefore, loosening of the flange fixation member 25 is prevented under vibration. The friction part 58 is retained by the retainer spring 26 attached to the recess 25e of the flange fixation member 25. Therefore, the friction part 58 does not drop off even when the operation member 60 is removed from the spool tubular portion 24.

As illustrated in FIG. 1, the rotor drive mechanism 5 includes a master gear 11 and the pinion gear 12. The master gear 11 is configured to rotate together with a master gear shaft 10. The handle 1 is herein fixed to the master gear shaft 10 while being unitarily rotatable with it. The pinion gear 12 meshes with the master gear 11. The master gear shaft 10 is supported by the reel unit 2 in a rotatable state. The pinion gear 12 is formed in a tubular shape. A front part 12a of the pinion gear 12 extends towards the spool 4 while passing through the boss portion 3f of the rotor 3. The rotor 3 is fixed to the front part 12a of the pinion gear 12 by a nut 13 while being unitarily rotatable with the pinion gear 12. The front part of the pinion gear 12 is supported in a rotatable state by the reel body 2a through a bearing 14a, whereas the intermediate part of the pinion gear 12 is supported in a rotatable state by the reel body 2a through a bearing 14b. Loosening of the nut 13 is prevented by a retainer 36. Further, the nut 13 makes contact with the spool shaft 8 through a bearing 13a. Accordingly, a clearance is produced between the inner peripheral surface of the pinion gear 12 and the outer peripheral surface of the spool shaft 8. A third sealing member 36b is attached to the retainer 36 for preventing liquid intrusion through a clearance between the spool shaft 8 and the pinion gear 12.

As illustrated in FIG. 1, the oscillation mechanism 20 is of a traverse cam type and includes an intermediate gear 20a, a spiral shaft 20b, and a slider 20c. The intermediate gear 20a meshes with the pinion gear 12. The spiral shaft 20b is attached to the reel body 2a while being rotatable about an axis parallel to the spool shaft 8. The slider 20c is configured to move back and forth in conjunction with rotation of the spiral shaft 20b. The rear end of the spool shaft 8 is attached to the slider 20c while being prevented from both rotating and axially moving.

As illustrated in FIG. 2, the drag sound producing mechanism 56 is configured to produce sound in conjunction with relative rotation of the spool 4 and the spool shaft 8 during drag activation. The drag sound producing mechanism 56 includes the disc member 80, the pawl member 82, and an urging member 83. While prevented from rotating, the disc member 80 is fixed to the spool tubular portion 24 that is prevented from rotating with respect to the spool shaft 8. The pawl member 82 is attached to the attachment disc portion 22e of the spool 4 in a pivotable state. The urging member 83 urges the pawl member 82 towards a neutral position.

As illustrated in FIG. 1, the lever brake mechanism 6 includes a brake part 16, a brake lever 17, a coil spring 19, and a predetermined-brake-force switcher (not illustrated in the figure). The brake lever 17 is operated to regulate brake force of the brake part 16. The coil spring 19 urges the brake lever 17 in a direction separated away from the fishing rod attachment portion 2c. The predetermined-brake-force switcher is configured to switch between activation and deactivation of predetermined brake force in conjunction with an operation of the brake lever 17. The brake lever 17 is attached to the leg portion 2b of the reel body in a pivotable state.

The brake part 16 includes a brake-part main body 31 and a one-way clutch 32. The brake-part main body 31 is a tubular member that is braked by press-contact with the tip of the brake lever 17. The one-way clutch 32 is of a pawl type. The one-way clutch 32 is configured to deliver rotation of the rotor 3 in the fishing line release direction to the brake-part main body 31.

When the brake lever 17 is operated in a direction closer to the fishing rod attachment portion 2c, the brake-part main body 31 is braked by the brake lever 17 and rotation of the rotor 3 in the fishing line release direction is braked in accordance with the operational force. When the brake lever 17 is operated in a direction separated away from the fishing rod attachment portion 2c, on the other hand, the brake-part main body 31 is braked at predetermined brake force by an action of the predetermined-brake-force switcher.

Action and Operation of Reel

The bail arm 9 is required to be flipped down to a fishing line release posture in casting. When casting is performed under this condition, the fishing line is reeled out of the outer periphery of the spool 4. When the handle 1 is rotated in the fishing line winding direction for rewinding the reeled out fishing line, the bail arm 9 is returned to a fishing line winding posture by a return mechanism (not illustrated in the figure). Rotational force of the handle 1 is delivered to the pinion gear 12 through the master gear shaft 10 and the master gear 11. Rotational force delivered to the pinion gear 12 is further delivered to the rotor 3 through the front part 12a of the pinion gear 12. In this case, the rotor 3 is rotated in the fishing line winding direction. Therefore, the one-way clutch 32 is not activated and the rotational force is not delivered to the brake-part main body 31. When the pinion gear 12 is rotated, the spool shaft 8 is reciprocated back and froth. Accordingly, the fishing line is wound onto the spool 4.

Referring to FIGS. 1 and 2, if the rotor 3 is braked by operating the brake lever 17 and the operation member 60 is simultaneously operated for increasing drag force when a fish is caught, strong torque is delivered to the spool tubular portion 24 through the front drag mechanism 23. Accordingly, strong shear force is produced in a part of the anti-rotation pin 50, positioned closer to the outer peripheral surface of the spool shaft 8. In the present exemplary embodiment, however, annular groove with a small diameter is not formed on the part of the anti-rotation pin 50 where shear force is produced. Therefore, the strength of the anti-rotation pin 50 can be ensured even when the diameter of the anti-rotation pin 50 is reduced.

ALTERNATE EMBODIMENTS

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

SECOND EXEMPLARY EMBODIMENT

Figure 6:
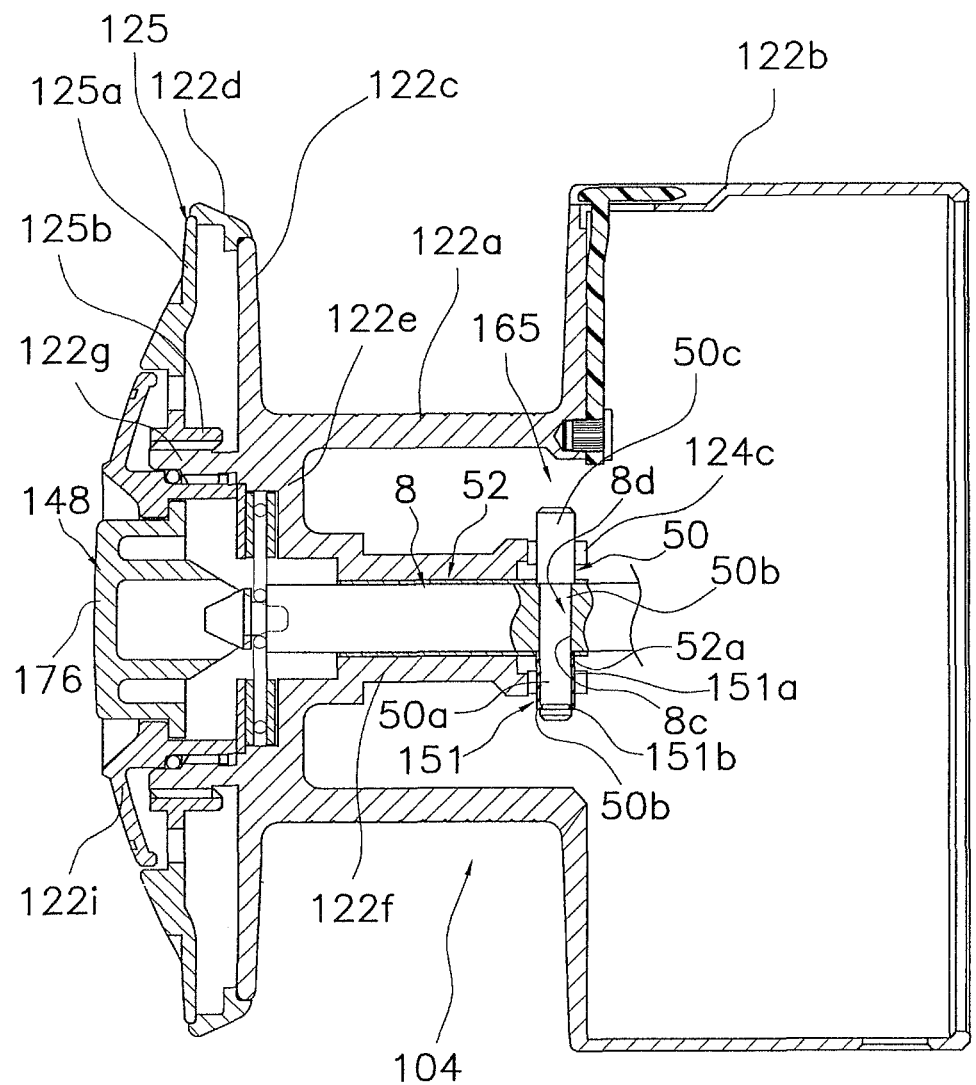
FIG. 6 is an enlarged cross-sectional view that corresponds to FIG. 2 of a spool and its periphery of a spinning reel according to a second exemplary embodiment.

In the first exemplary embodiment, the spool 4 with the drag mechanism has been exemplified for explaining the spool coupling structure. In a second exemplary embodiment, a spool without a drag mechanism will be exemplified for explaining the spool coupling structure. FIG. 6 illustrates a spool according to the second exemplary embodiment. The spool illustrated in FIG. 6 is structured basically identical to the spool 4 of the first exemplary embodiment, excluding a spool 104 and a spool coupling structure 165. Therefore, explanation of the other components excluding the spool and the spool coupling structure will be hereinafter omitted.

Figure 7:
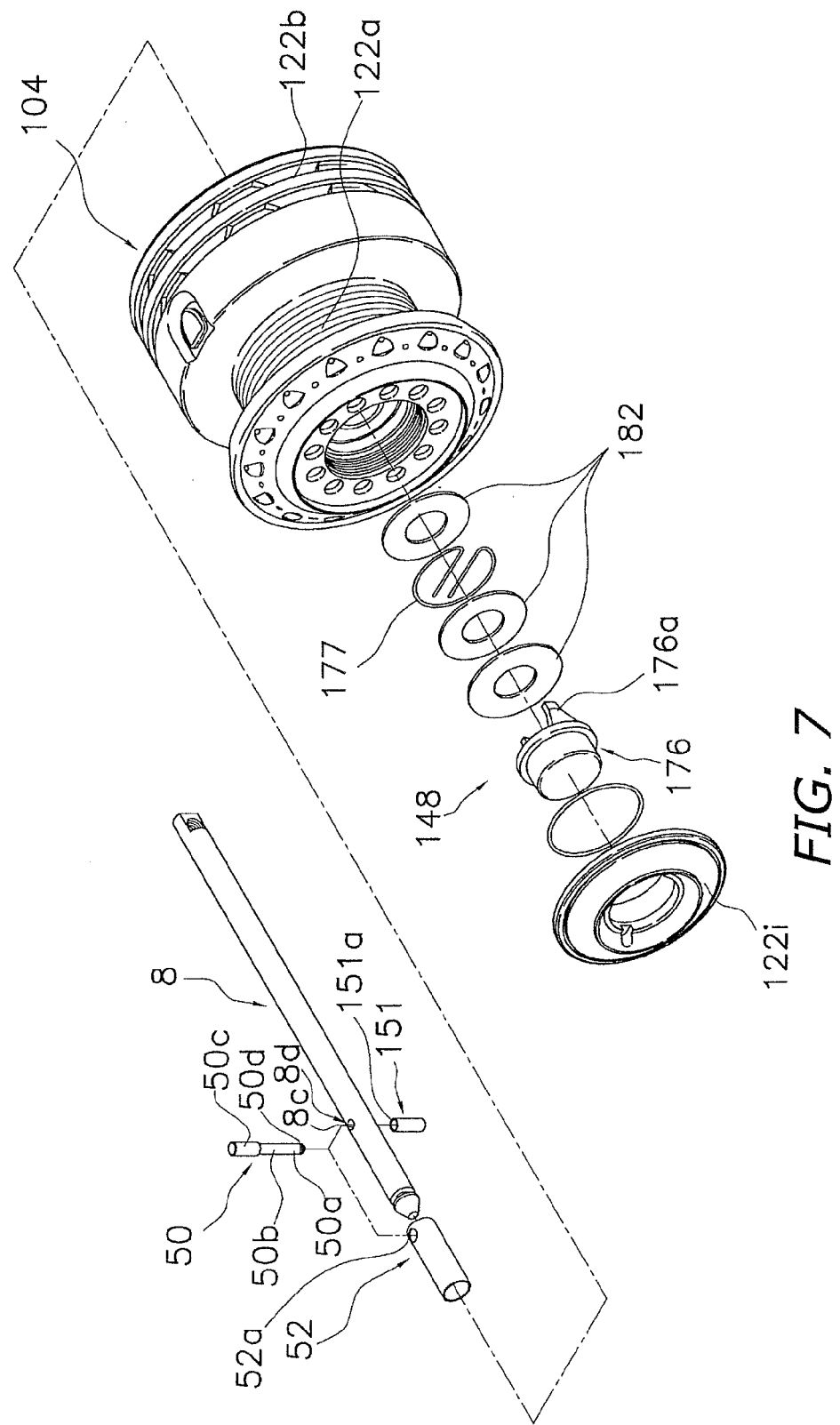
FIG. 7 is an exploded perspective view that corresponds to FIG. 3 of a spool coupling structure of the spinning reel according the second exemplary embodiment.

In FIGS. 6 and 7, the spool 104 is coupled to the spool shaft 8 while being prevented from rotating. The spool 104 includes a bobbin trunk 122a, a skirt portion 122b, and a flange portion 122c. The bobbin trunk 122a is formed in a tubular shape. The skirt portion 122b is formed on the rear end of the bobbin trunk 122a. The skirt portion 122b is formed in a tubular shape and has a diameter greater than that of the bobbin trunk 122a. The flange portion 122c is formed on the front part of the bobbin trunk 122a. The flange portion 122c slants forward, i.e., extends to the front in a direction that is not perpendicular to the first axis X.

The bobbin trunk 122a includes an attachment disc portion 122e and an attachment tubular portion 122f (an example of the boss portion). The attachment disc portion 122e extends from the bobbin trunk 122a in a radial inward direction. The attachment tubular portion 122f is integrally formed with the inner peripheral side of the attachment disc portion 122e to form a one piece unitary member. The attachment disc portion 122e is integrally formed with the inner peripheral surface of the front part of the bobbin trunk 122a to form a one piece unitary member. A fixation tubular portion 122g forwardly protrudes from the front surface of the attachment disc portion 122e.

A flow smoother member 122d is attached to the outer peripheral surface of the flange portion 122c. The flow smoother member 122d includes a tapered surface expanded towards its tip. In other words, the flow smoother member 122d is inclined outward and upward from a portion contacting the flange portion 122c. The flow smoother member 122d is fixed to the flange portion 122c by a flange fixation member 125. The flange fixation member 125 includes a press portion 125a and a first tubular portion 125b. The press portion 125a is formed in a tapered shape and presses the flow smoother member 122d. The first tubular portion 125b extends rearward from the press portion 125a. The first tubular portion 125b is fixedly screwed onto the outer periphery of the fixation tubular portion 122g. Further, a front cover portion 122i, formed in a disc shape, is fixedly screwed into the inner periphery of the fixation tubular portion 122g. A push button 176 of a single touch attachment/detachment mechanism 148 is attached to the front cover portion 122i while being allowed to move back and forth. The attachment tubular portion 122f includes an engagement groove 124c on its rear end. The engagement groove 124c is formed along the diameter of the attachment tubular portion 122f. The anti-rotation pin 50 is engaged with the engagement groove 124c. The anti-rotation pin 50 prevents the spool 104 from rotating with respect to the spool shaft 8.

As illustrated in FIG. 7, the single touch attachment/detachment mechanism 148 includes the push button 176 and a retainer spring 177. The push button 176 is attached to the front cover portion 122i of the spool 104 while being allowed to move back and forth. The push button 176 is a member formed in a roughly closed-end tubular shape. The push button 176 forwardly protrudes from the front cover portion 122i. The push button 176 is prevented from being detached from the front cover portion 122i while being forwardly urged by the retainer spring 177. The push button 176 includes a tapered cam protrusion 176a in its base end. The cam protrusion 176a is provided for moving the retainer spring 177. The retainer spring 177 is formed by bending a spring wire rod in a roughly E-shape. More specifically, the retainer spring 177 has rods that are parallel or substantially parallel to each other. The rods have proximal ends that are joined by a circular portion that extends from either of the proximal ends around the distal ends of the parallel rods to the other of the proximal ends. The retainer spring 177 is held by plural washer members 182 attached to the inner peripheral surface of the front cover portion 122i. The spool 104 can be detached from the spool shaft 8 by disengaging the retainer spring 177 from the retainer groove 8b through a press operation of the push button 176. When the spool 104 is attached to the spool shaft 8, on the other hand, the retainer spring 177 is expanded along the tapered surface 8a of the distal end of the spool shaft 8. When reaching the retainer groove 8b, the retainer spring 177 is engaged with it by its own elasticity.

The anti-rotation pin 50 of the present exemplary embodiment is structured identical or substantially identical to that of the first exemplary embodiment. A retainer member 151 is attached to the outer peripheral side of the first anti-rotation portion 50a. Specifically, the retainer member 151 is disposed on the opposite side of the second anti-rotation portion 50c through the spool shaft 8. The retainer member 151 prevents the anti-rotation pin 50 from being detached from the spool shaft 8. The retainer member 151 has an outer diameter enabling it to be engaged with the engagement groove 124c and an inner diameter enabling it to be fitted with the outer peripheral surface of the first anti-rotation portion 50a. Therefore, the retainer member 151 has an outer diameter substantially identical to that of the second anti-rotation portion 50c. In the second exemplary embodiment, the retainer member 151 includes a tubular body 151a made of synthetic resin (e.g., synthetic rubber or polyacetal). The retainer member 151 has an axial length enabling it to make contact with the outer peripheral surface of the spool shaft 8. The retainer member 151 includes an annular engagement protrusion 151b on the inner peripheral surface of one end thereof. The engagement protrusion 151b extends radially inward and engages with the annular groove 50d. When the engagement protrusion 151b engages with the annular groove 50d by its own elasticity, the retainer member 151 is prevented from being detached from the anti-rotation pin 50. In the second exemplary embodiment, the retainer member 151 is attached to the first anti-rotation portion 50a while the other end of the retainer member 151 makes contact with the outer peripheral surface of the spool shaft 8.

The sleeve 52 is attached between the spool shaft 8 and the attachment tubular portion 122f to maintain compatibility to the well-known spool shafts with a diameter of, e.g., 4.5 mm. The sleeve 52 of the present exemplary embodiment is structured identical or substantially identical to that of the first exemplary embodiment.

The present invention can provide a structure that can be applied to the aforementioned spool 104 without the drag mechanism.

Features (A) The spool coupling structure 65 (or the spool coupling structure 165) is a structure of coupling the spool 4 (or the spool 104) of the spinning reel to the spool shaft 8 passing through the spool 4 (or the spool 104) under a condition in which the spool 4 (or the spool 104) is prevented from rotating with respect to the spool shaft 8. The spool coupling structure 65 (or the spool coupling structure 165) includes the pin insertion portion 8d, the anti-rotation pin 50, the retainer member 51 (or the retainer member 151), and the engagement groove 24c (or the engagement groove 124c). The pin insertion portion 8d includes the through hole 8c passing through the spool shaft 8 along its radial direction. The anti-rotation pin 50 includes the first anti-rotation portion 50a provided on the first end thereof, the fitting portion 50b, and the second anti-rotation portion 50c. The fitting portion 50b is disposed adjoining the first anti-rotation portion 50a. The fitting portion 50b has a length enabling it to be fitted with the pin insertion portion 8d. The second anti-rotation portion 50c extends from the fitting portion 50b towards the second end of the anti-rotation pin 50. The second anti-rotation portion 50c has a diameter greater than that of the pin insertion portion 8d. The retainer member 51 (or the retainer member 151) prevents the anti-rotation pin 50 from being detached from the spool shaft 8. The retainer member 51 (or the retainer member 151) is disposed on the outer peripheral side of the first anti-rotation portion 50a while being positioned on the opposite side of the second anti-rotation portion 50c through the spool shaft 8. The retainer member 51 has an axial length enabling it to make contact with the spool shaft 8. The engagement groove 24c is formed along the diameter of the spool shaft 8 in a part of the spool 4 (or the spool 4) where the spool shaft 8 passes through. The engagement groove 24c has a groove width enabling the second anti-rotation portion 50c to be engaged therewith.

In the spool coupling structure 65 (or the spool coupling structure 165), the anti-rotation pin 50 is inserted into the pin insertion portion 8d of the spool shaft 8 from the first end side where the first anti-rotation portion 50a is positioned. Accordingly, the stepped portion, formed between the second anti-rotation portion 50c with a large diameter and the pin insertion portion 8d, is abutted to the outer peripheral surface of the spool shaft 8. The anti-rotation pin 50 is thereby set to be in an appropriate position. The first anti-rotation portion 50a, disposed on the first end side, protrudes from the pin insertion portion 8d under this condition. The retainer member 51 (or the retainer member 151) is attached to the protruding first anti-rotation portion 50a for retaining the anti-rotation pin 50. When the spool 4 (or the spool 104) is attached to the spool shaft 8 while the anti-rotation pin 50 is attached to the spool shaft 8, the anti-rotation pin 50 is engaged with the engagement groove 24c (or the engagement groove 124c) of the spool 4 (or the spool 104). Accordingly, the spool 4 (or the spool 104) is coupled to the spool shaft 8 while being prevented from rotating with respect to the spool shaft 8.

In this case, the anti-rotation pin 50 is retained by attaching the retainer member 51 (or the retainer member 151) to the first anti-rotation portion 50a of the anti-rotation pin 50. Therefore, an annular groove for retaining the anti-rotation pin 50 is not required to be formed on a part of the anti-rotation pin 50 positioned in the vicinity of the outer peripheral surface of the spool shaft 8 where shear force is produced. Consequently, strength of the anti-rotation pin 50 can be ensured even when the diameter of the anti-rotation pin 50 is reduced.

(B) In the spool coupling structure 65 (or the spool coupling structure 165), the first anti-rotation portion 50a has a diameter identical to that of the fitting portion 50b. In this case, the anti-rotation pin 50 can reliably have strength greater than that of the anti-rotation pin 50 having a configuration in which the first anti-rotation portion 50a has a diameter less than that of the fitting portion 50b, because the anti-rotation pin 50 herein has a configuration such that the fitting portion 50b has an outer diameter identical to that of the first anti-rotation portion 50a.

(C) In the spool coupling structure 65 (or the spool coupling structure 165), the retainer member 51 (or the retainer member 151) has an outer diameter enabling it to be engaged with the engagement groove 24c (or the engagement groove 124c). In this case, the spool 4 (or the spool 104) is prevented from easily wobbling because the retainer member 51 (or the retainer member 151) has an outer diameter enabling it to be engaged with the engagement groove 24c (or the engagement groove 124c).

(D) In the spool coupling structure 65, the retainer member 51 includes the coil spring 51a attachable to the outer peripheral side of the fitting portion 50b. In this case, the anti-rotation pin 50 can be retained with a structure in which one end of the coil spring 51a is retained and the other end thereof makes contact with the spool shaft 8 in a free-length state or a compressed state.

(E) In the spool coupling structure 65, the anti-rotation pin 50 further includes the annular groove 50d formed on a part of the first anti-rotation portion 50a on the first end side. The end portion of the coil spring 51a on the first end side is formed to have a small diameter enabling it to be engaged with the annular groove 50d. In this case, the annular groove 50d is formed on the first end side on which shear force does not act. Therefore, the retainer member 51 can be prevented from being detached from the annular groove 50d while its strength can be ensured for the anti-rotation pin 50 with a small diameter even when the annular groove 50d is formed.

(F) The spool coupling structure 65 (or the spool coupling structure 165) further includes the sleeve 52. The sleeve 52 is fitted onto the outer peripheral surface of the spool shaft 8 and includes the through hole 52a communicating with the pin insertion portion 8d. Even when the diameter of the spool shaft 8 is reduced, the sleeve 52 herein enables the spool 4 (or the spool 104), designed to be coupled to a spool shaft with a large diameter, to be coupled to the spool shaft 8. Accordingly, it is possible to maintain compatibility to the spools designed to be coupled to a spool shaft with a large diameter.

(G) In the spool coupling structure 165, the spool 104 includes the bobbin trunk 122a in which the fishing line is wound around the outer periphery thereof, and the attachment tubular portion 122f formed on the inner peripheral side of the bobbin trunk 122a. The engagement groove 124c is formed on the attachment tubular portion 122f along its diameter. In this case, the spool 104 and the spool shaft 8 can be coupled while being allowed to rotate unitarily or prevented from relatively rotating.

(H) In the spool coupling structure 65, the spool 4 includes the spool body 22 and the spool tubular portion 24. The spool body 22 includes the bobbin trunk 22a around whose outer periphery the fishing line is wound and the attachment tubular portion 22f formed on the inner peripheral side of the bobbin trunk 22a. The spool tubular portion 24 is attached to the spool shaft 8 under the condition that the spool tubular portion 24 supports the spool body 22 while allowing it to rotate. The engagement groove 24c is formed on the rear end portion 24b of the spool tubular portion 24 along its diameter. In this case, the spool body 22 and the spool tubular portion 24 are allowed to rotate relatively. Therefore, the front drag mechanism 23 can be disposed between the spool body 22 and the spool tubular portion 24.

OTHER EXEMPLARY EMBODIMENTS

Exemplary embodiments have been described above. However, the present invention is not limited to the aforementioned exemplary embodiments. Various changes can be made for the aforementioned exemplary embodiments without departing from the scope of the present invention.

(a) In both of the aforementioned exemplary embodiments, the spinning reels of a lever-brake type have been exemplified. However, the present invention is not necessarily limited to the spinning reels of a lever-brake type. For example, the present invention may be applied to the spinning reels of a rear-drag type or the spinning reels of a front-drag type. In these cases, the present invention is desirably applied to the spinning reels provided with a single touch attachment/detachment mechanism.

(b) In the aforementioned exemplary embodiments, the coil spring 51a (or the tubular body 151a made of synthetic resin) is described as the retainer member 51 (or the retainer member 151). However, the retainer member is not limited to them. For example, the retainer member may be an O-ring or may be composed of disc springs or corrugated plate springs. Alternatively, the retainer member may be a rod-shaped member with a polygonal outline that includes a circular hole in its center.

(c) In the aforementioned exemplary embodiments, the retainer member 51 (or the retainer member 151) is retained by the annular groove 50d formed on the anti-rotation pin 50. However, the structure for retaining the retainer member 51 is not limited to them. For example, the annular groove 50d may not be formed on the anti-rotation pin 50, and the retainer member 51 may be retained onto the first-anti-rotation portion 50a of the anti-rotation pin 50 by means of its own elasticity. In this case, the inner diameter of the retainer member may be slightly smaller than the outer diameter of the first anti-rotation portion.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a spinning-reel spool. Accordingly, these terms, as utilized to describe the present invention should be interpreted relative to a spinning-reel spool as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel spool coupling structure to couple a spinning reel spool to a spool shaft passing through the spinning reel spool under a condition in which the spinning reel spool is prevented from rotating relative to the spool shaft, comprising:
    a pin insertion portion having a through hole passing through the spool shaft and extending along a diameter of the spool shaft;
    an anti-rotation pin including
        a first anti-rotation portion provided on a first end of the anti-rotation pin,
        a fitting portion disposed adjoining the first anti-rotation portion, the fitting portion having a length such that the fitting portion is fitted into the pin insertion portion, and
        a second anti-rotation portion extending from the fitting portion towards a second end of the anti-rotation pin, the second anti-rotation portion having a diameter greater than a diameter of the pin insertion portion;
    a retainer member preventing the anti-rotation pin from being detached from the spool shaft, the retainer member disposed on an outer peripheral side of the first anti-rotation portion, the retainer member having an axial length such that the retainer member contacts the spool shaft; and
    an anti-rotation groove formed on a boss configured at an end of a spool tubular portion, to which the spool shaft is inserted, the anti-rotation groove extending in a direction substantially perpendicular to a length of the spool shaft, the anti-rotation groove engaging the second anti-rotation portion.

2. The spinning reel spool coupling structure according to claim 1, wherein the first anti-rotation portion has a diameter identical to a diameter of the fitting portion.

3. The spinning reel spool coupling structure according to claim 1, wherein the retainer member engages with the anti-rotation groove.

4. The spinning reel spool coupling structure according to claim 1, wherein the retainer member includes a coil spring that attaches to the outer peripheral side of the first anti-rotation portion.

5. The spinning reel spool coupling structure according to claim 4, wherein
    the anti-rotation pin further includes an annular groove formed on a part of the first anti-rotation portion on the first end side, and
    the coil spring has first and second diameters and a first end side end portion, the second diameter is smaller than the first diameter, and the end portion engages with the annular groove.

6. The spinning reel spool coupling structure according to claim 1, further comprising a sleeve fitted onto an outer peripheral surface of the spool shaft, the sleeve including a retainer hole communicating with the pin insertion portion.

7. The spinning reel spool coupling structure according to claim 1, wherein the spinning reel spool includes a bobbin trunk allowing a fishing line to be wound thereon and a tubular boss portion provided on an inner peripheral side of the bobbin trunk, and the anti-rotation groove is formed on an end surface of the boss portion along a diameter of the boss portion.

8. The spinning reel spool coupling structure according to claim 1, wherein the spinning reel spool includes a spool body has a bobbin trunk allowing a fishing line to be wound thereon and a tubular boss portion provided on an inner peripheral side of the bobbin trunk, and a tubular member attached to the spool shaft such that the tubular member supports the boss portion of the spool body in a rotatable state, and the anti-rotation groove is formed on an end surface of the tubular member along a diameter of the tubular member.

9. A spinning reel, comprising:

a spinning reel spool;

a spool shaft passing through the spinning reel spool being relatively non-rotatably connected to the spinning reel spool and having a through hole passing through and extending along a diameter of the spool shaft; and a coupling structure coupling the spinning reel spool to the spool shaft, the coupling structure including a pin insertion portion having the through hole;

an anti-rotation pin including a first anti-rotation portion provided on a first end of the anti-rotation pin, a fitting portion disposed adjoining the first anti-rotation portion, the fitting portion having a length such that the fitting portion is fitted into the pin insertion portion, and a second anti-rotation portion extending from the fitting portion towards a second end of the anti-rotation pin, the second anti-rotation portion having a diameter greater than a diameter of the pin insertion portion, a retainer member preventing the anti-rotation pin from being detached from the spool shaft, the retainer member disposed on an outer peripheral side of the first anti-rotation portion, the retainer member having an axial length such that the retainer member contacts the spool shaft, and an anti-rotation groove formed on a boss configured at an end of a spool tubular portion, to which the spool shaft is inserted, the anti-rotation groove extending in a direction substantially perpendicular to a length of the spool shaft, the anti-rotation groove engaging the second anti-rotation portion.

10. The spinning reel according to claim 9, wherein the first anti-rotation portion has a diameter identical to a diameter of the fitting portion.

11. The spinning reel according to claim 9, wherein the retainer member engages with the anti-rotation groove.

12. The spinning reel according to claim 1, wherein the retainer member includes a coil spring that attaches to the outer peripheral side of the first anti-rotation portion.

13. The spinning reel according to claim 12, wherein the anti-rotation pin further includes an annular groove formed on a part of the first anti-rotation portion on the first end side, and the coil spring has first and second diameters and a first end side end portion, the second diameter is smaller than the first diameter, and the end portion engages with the annular groove.

14. The spinning reel according to claim 9, further comprising a sleeve fitted onto an outer peripheral surface of the spool shaft, the sleeve including a retainer hole communicating with the pin insertion portion.

15. The spinning reel according to claim 9, wherein the spinning reel spool includes a bobbin trunk allowing a fishing line to be wound thereon and a tubular boss portion provided on an inner peripheral side of the bobbin trunk, and the anti-rotation groove is formed on an end surface of the boss portion along a diameter of the boss portion.

16. The spinning reel according to claim 9, wherein the spinning reel spool includes a spool body has a bobbin trunk allowing a fishing line to be wound thereon and a tubular boss portion provided on an inner peripheral side of the bobbin trunk, and a tubular member attached to the spool shaft such that the tubular member supports the boss portion of the spool body in a rotatable state, and the anti-rotation groove is formed on an end surface of the tubular member along a diameter of the tubular member.

* * * * *